(No Model.)
C. EIMBECK & F. WEHRMANN.
Coupling for Vehicle Axles.
No. 232,473. Patented Sept. 21, 1880.
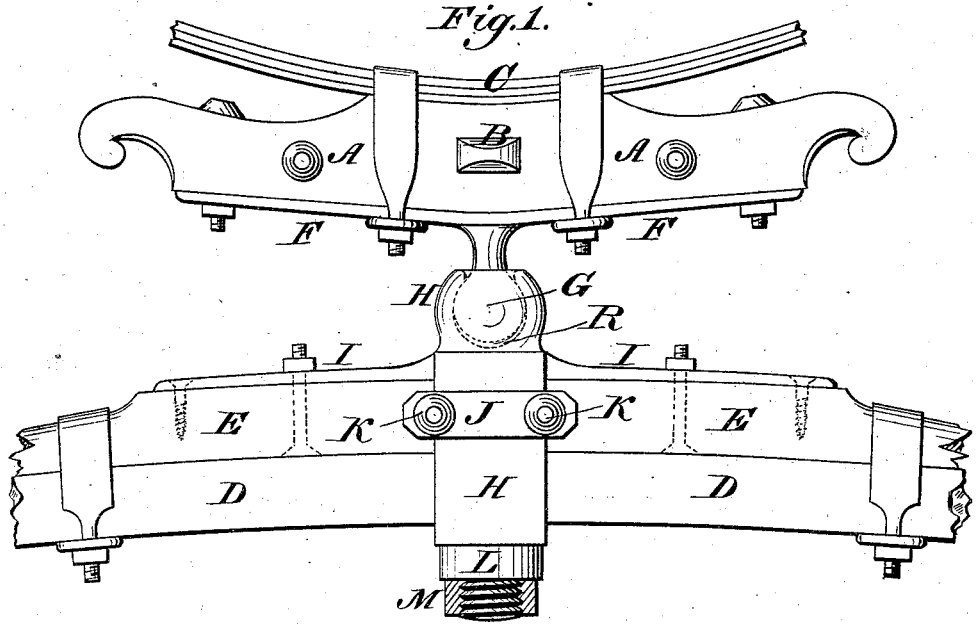
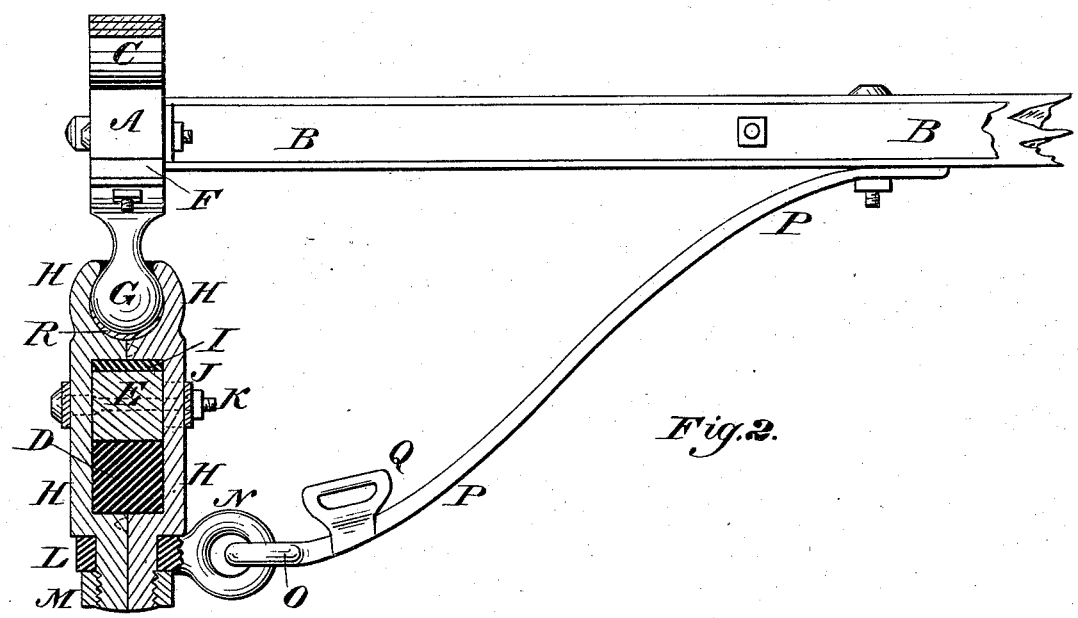
WITNESSES:
INVENTOR:
C. Eimbeck
F. Wehrmann
BY
ATTORNEYS.

UNITED STATES PATENT OFFICE.

CONRAD EIMBECK AND FRITZ WEHRMANN, OF NEW HAVEN, MISSOURI.

COUPLING FOR VEHICLE-AXLES.

SPECIFICATION forming part of Letters Patent No. 232,473, dated September 21, 1880.

Application filed August 7, 1880. (No model.)

*To all whom it may concern:*

Be it known that we, CONRAD EIMBECK and FRITZ WEHRMANN, of New Haven, in the county of Franklin and State of Missouri, have invented a new and useful Improvement in Ball-and-Socket Couplings for the Forward Axles of Vehicles, of which the following is a specification.

Figure 1 is a front elevation of the improvement. Fig. 2 is a sectional side elevation.

Similar letters of reference indicate corresponding parts.

The object of this invention is to furnish couplings for connecting the forward axles and the bodies of buggies, buckboard-wagons, and other vehicles, so constructed as to give the axle a free vertical and horizontal play, and thus better adapt the vehicles for use upon rough, uneven, and sideling roads.

The invention consists in constructing a coupling for the forward axles of vehicles of a ball connected with the head-block, socket-bars attached to the forward axle, and a collar having an eye interlocking with an eye upon the end of a brace attached to the reach, whereby the axle can have a free horizontal and vertical play, and will be prevented from rocking forward and back, as will be hereinafter fully described.

A represents the head-block, which is attached to the forward end of the reach B, and to which the forward springs, C, are secured.

D is the forward axle, to which the axle-stick E is secured in the usual manner.

To the lower side of the head-block A is attached a plate, F, to the center of which is secured or upon it is formed the neck of a knob or ball, G. The ball G is placed in a socket formed in the adjacent sides of the upper ends of two bars, H. The adjacent sides of the middle parts of the bars H are notched to receive and fit upon the axle D, the axle-stick E, and a plate, I, secured to the upper side of the said axle-stick E.

The bars H are secured to the forward and rear sides of the axle D by yokes J, crossing the said bars H, and the bolts K, passing through the ends of the yokes J and through the axle-stick E. The lower ends of the bars H are rounded off, and upon them is placed a ring or collar, L, which is secured in place by a nut, M, screwed upon the lower ends of the said bars H.

Upon the rear side of the ring L is formed an eye, N, which interlocks with an eye, O, formed upon the forward end of the brace P. The brace P inclines upward and rearward, and its rear end is bolted to the reach B, so as to hold the axle in an upright position and prevent it from rocking forward or backward without interfering with its horizontal movement in turning the vehicle or its vertical movement in adjusting itself to sideling ground.

Upon the sides of the forward part of the brace P are formed eyes Q, to receive stay or balance straps to be attached to the body or buckboard of the vehicle to hold the said body or buckboard from rocking laterally.

In the socket in the upper ends of the bars H is placed a cup-shaped bushing, R, of brass or other suitable anti-friction metal or composition of metals, to receive the ball G, prevent the wear of the said ball and socket, and serve as a cup to receive oil. The bar I has shoulders formed upon its upper side to rest against the opposite sides of the upper parts of the bars H, and is designed to distribute the weight along the axle, and thus relieve the center of the said axle.

With this improvement the vehicle can be turned with as much ease as though a fifth-wheel were used, and at the same time the forward axle can incline toward either side of the vehicle, even though the rear axle be inclined in the opposite direction, without any danger of breaking the coupling, thus adapting the vehicle to be used upon rough, uneven, and sideling roads.

Having thus described our invention, what we claim as new, and desire to secure by Letters Patent, is—

1. A ball-and-socket coupling for the forward axles of vehicles, constructed substantially as herein shown and described, consisting of the ball G, secured to the head-block A, the socket-bars H, secured to the forward axle D, the collar L, having eye N, and the brace P, having eye O, as set forth.

2. In a ball-and-socket coupling for the forward axles of vehicles, the combination, with the ball G, attached to the head-block A, the socket-bars H, attached to the axle D, and the brace P, attached to the reach B, and having eyes O and Q, of the collar L, having eye N, substantially as herein shown and described, whereby the axle is held in an upright position and kept from rocking, as set forth.

CONRAD EIMBECK.
FRITZ WEHRMANN.

Witnesses:
ADOLPH RUGE,
MAX EIMBECK.